(12) United States Patent
Kraft et al.

(10) Patent No.: US 10,099,330 B2
(45) Date of Patent: Oct. 16, 2018

(54) SYSTEM AND METHOD FOR PROVIDING TOOLS ON A MACHINE TOOL AND MACHINE TOOL HAVING A TOOL CHANGE SYSTEM

(71) Applicant: DECKEL MAHO PFRONTEN GMBH, Pfronten (DE)

(72) Inventors: Oliver Kraft, Pfronten (DE); Sebastian Riedel, Weissensee (DE); Michael Trenkle, Pfronten (DE)

(73) Assignee: DECKEL MAHO PFRONTEN GMBH, Pfronten (DE)

( * ) Notice: Subject to any disclaimer, the term of this patent is extended or adjusted under 35 U.S.C. 154(b) by 157 days.

(21) Appl. No.: 14/363,946

(22) PCT Filed: Dec. 7, 2012

(86) PCT No.: PCT/EP2012/074746
§ 371 (c)(1),
(2) Date: Jun. 9, 2014

(87) PCT Pub. No.: WO2013/083756
PCT Pub. Date: Jun. 13, 2013

(65) Prior Publication Data
US 2014/0342889 A1 Nov. 20, 2014

(30) Foreign Application Priority Data
Dec. 8, 2011 (DE) .................... 10 2011 088 055

(51) Int. Cl.
*B23Q 3/157* (2006.01)
*B23Q 3/155* (2006.01)

(52) U.S. Cl.
CPC ........ *B23Q 3/15539* (2016.11); *B23Q 3/1554* (2013.01); *B23Q 3/1572* (2013.01);
(Continued)

(58) Field of Classification Search
CPC ............ B23Q 3/15513; B23Q 3/15713; B23Q 3/15773; B23Q 2003/15593;
(Continued)

(56) References Cited

U.S. PATENT DOCUMENTS 3,744,648 A * 7/1973 Kuhnert ................. G05B 19/23
414/730
4,087,901 A * 5/1978 Lohneis ............. B23Q 3/15526
483/41
(Continued)

FOREIGN PATENT DOCUMENTS

CH 654237 A5 * 2/1986 ............... B23Q 1/66
CN 1880010 A 12/2006
(Continued)

OTHER PUBLICATIONS

EPO Machine Translation of WO 88/00510—Klaus et al., "Tool Changing Device for Machine Tools," Jan. 28, 1988.*
(Continued)

*Primary Examiner* — Sunil K Singh
*Assistant Examiner* — Michael Vitale
(74) *Attorney, Agent, or Firm* — Oliff PLC

(57) ABSTRACT

The present invention relates to a system, an apparatus and a method for providing tools on a machine tool. The system includes a first tool magazine for accommodating a plurality of tools; a first feeding device which is adapted to remove tools from the first tool magazine and feed them to the spindle; at least one second tool magazine for accommodating a plurality of tools; a second feeding device which is adapted to remove tools from the second tool magazine and provide them at a predetermined transfer position; and a transfer apparatus which is adapted to feed tools removed from the second tool magazine to the first tool magazine,
(Continued)

with the result that the second tool magazine serves as a supply magazine for the first tool magazine.

12 Claims, 11 Drawing Sheets

(52) U.S. Cl.
CPC ...... *B23Q 3/15503* (2016.11); *B23Q 3/15526* (2013.01); *B23Q 3/15713* (2013.01); *B23Q 3/15773* (2013.01); *B23Q 2003/155435* (2016.11); *Y10T 483/10* (2015.01); *Y10T 483/175* (2015.01); *Y10T 483/1767* (2015.01); *Y10T 483/1786* (2015.01)

(58) Field of Classification Search
CPC ....... B23Q 2003/155407; B23Q 2003/155449; Y10T 483/1748; Y10T 483/175; Y10T 483/1757; Y10T 483/176; Y10T 483/1767; Y10T 483/1769; Y10T 483/1776; Y10T 483/1779; Y10T 483/1783; Y10T 483/1786; Y10T 483/1788
USPC ........ 483/36, 37, 40, 41, 44, 45, 46, 48, 49, 483/51, 52, 53
See application file for complete search history.

(56) References Cited

U.S. PATENT DOCUMENTS

| | | | |
|---|---|---|---|
| 4,156,962 A | 6/1979 | Haller | |
| 4,394,908 A * | 7/1983 | Pinchemaille | B23Q 3/15526 211/1.54 |
| 4,625,387 A | 12/1986 | Stoilov | |
| 4,866,835 A | 9/1989 | Novak | |
| 4,993,996 A | 2/1991 | Horny et al. | |
| 5,885,200 A * | 3/1999 | Sugihara | B23Q 3/155 483/40 |
| 2002/0013202 A1 | 1/2002 | Kato | |
| 2004/0162201 A1* | 8/2004 | Ferrari | B23Q 1/012 483/49 |
| 2005/0026758 A1 | 2/2005 | Geissler et al. | |
| 2006/0079384 A1* | 4/2006 | Yoshida | B23Q 3/15713 483/7 |
| 2007/0087924 A1 | 4/2007 | Krosta et al. | |
| 2007/0167303 A1* | 7/2007 | Schmauder | B23Q 3/15526 483/61 |
| 2010/0004107 A1 | 1/2010 | Amaya et al. | |
| 2010/0204028 A1 | 8/2010 | Geissler | |
| 2011/0015049 A1 | 1/2011 | Grob | |
| 2011/0039670 A1* | 2/2011 | Honegger | B23Q 1/012 483/56 |

FOREIGN PATENT DOCUMENTS

| | | | |
|---|---|---|---|
| DE | 34 40 356 A1 | 5/1985 | |
| DE | 39 05 780 C1 | 1/1990 | |
| DE | 90 14 433.3 U1 | 1/1991 | |
| DE | 40 33 036 A1 | 1/1992 | |
| DE | 101 63 294 A1 | 7/2003 | |
| DE | 102 36 342 A1 | 2/2004 | |
| DE | 103 34 346 A1 | 3/2005 | |
| DE | 20 2006 009 974 U1 | 10/2006 | |
| DE | 10 2005 052 353 A1 | 5/2007 | |
| DE | 10 2009 008 647 A1 | 9/2010 | |
| DE | 10 2009 031 202 A1 | 12/2010 | |
| EP | 0 266 647 A1 | 5/1988 | |
| FR | 2 347 155 A1 | 11/1977 | |
| JP | A-56-157934 | 12/1981 | |
| JP | 58143934 A * | 8/1983 | |
| JP | 61226241 A * | 10/1986 | ......... B23Q 3/15526 |
| JP | 62199333 A * | 9/1987 | |
| JP | 63191536 A * | 8/1988 | |
| JP | 2002-036052 A | 2/2002 | |
| JP | 2010-12522 A | 1/2010 | |
| KR | 20010063101 A | 7/2001 | |
| WO | WO 88/00510 A1 | 1/1988 | |

OTHER PUBLICATIONS

Partial translation of Nov. 20, 2012 Office Action issued in German Patent Application No. DE 10 2011 088 055.0.
May 29, 2013 International Search Report issued in International Application No. PCT/EP2012/074746.
Jun. 10, 2014 International Preliminary Report on Patentability issued in International Application No. PCT/EP2012/074746.
Aug. 17, 2015 Office Action issued in Chinese Patent Application No. 201280060761.5.
Sep. 7, 2016 Office Action issued in Japanese Patent Application No. 2014-545283.

\* cited by examiner

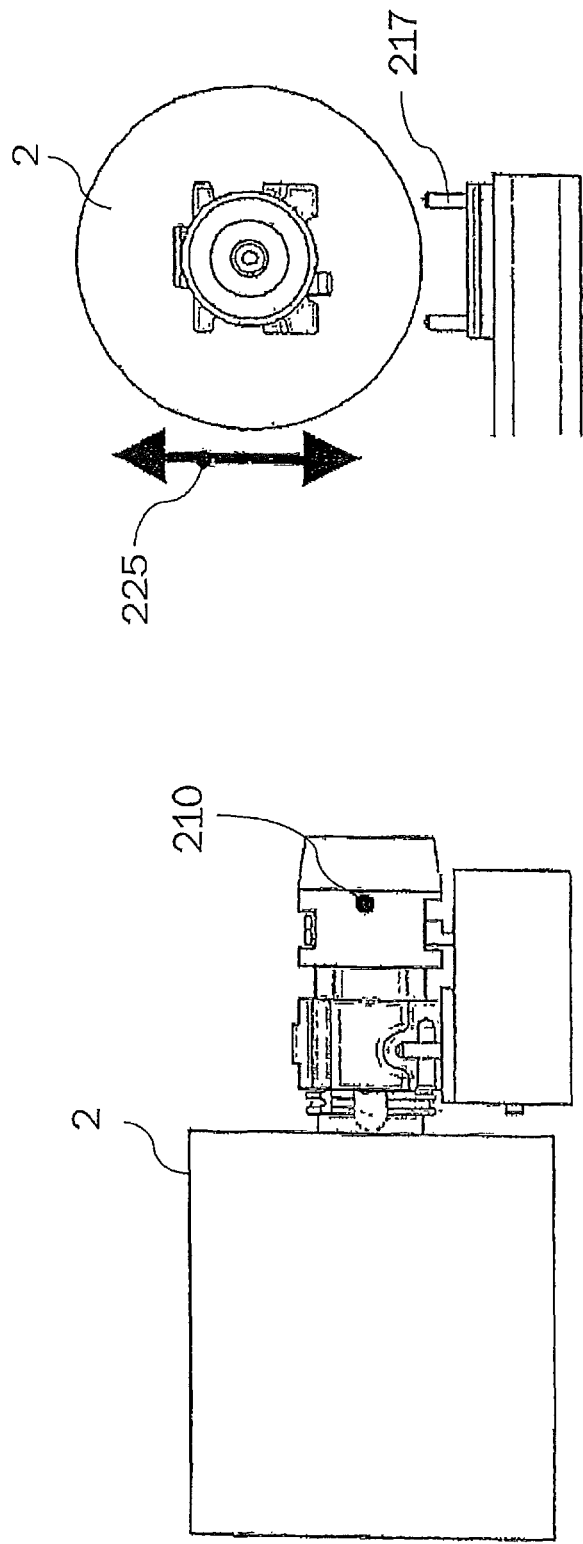

SYSTEM AND METHOD FOR PROVIDING TOOLS ON A MACHINE TOOL AND MACHINE TOOL HAVING A TOOL CHANGE SYSTEM

The present invention relates to a system and a method for providing tools on a machine tool and to a machine tool which serves for processing a workpiece and includes a tool change system.

BACKGROUND OF THE INVENTION

Systems for providing tools on a machine tool and tool magazines for tool storage of a machine tool are known in various designs from the prior art. Tool change systems are used in milling machining centers, for example, to reduce the auxiliary process time of the respective processing machine, i.e. the so-called chip-to-chip times, for example.

By means of tool change systems of this type, tools are transferred from a tool magazine to a machining spindle of a machine tool and/or from the latter back into the tool magazine, if required. This is optionally performed in fully automated and program-controlled fashion.

For this purpose, today's tool magazines for machine tools accommodate a plurality of tools for tool storage and supply them to the machine if the latter requires a tool for the next operational step or accommodate an already used tool from the machine for storage.

The prior art here discloses in particular two fundamental types of machine magazines which differ in that either the tools are stored in a stationary, immovable tool holder and a movable manipulator travels to the tool storage position where it removes the tool by means of a removing device or that the accommodation means for storing and/or accommodating the tools is moved to a predetermined removing position where the desired tool is removed from the removing device of the stationary manipulator.

For example, chain magazines for machine tools having a rigid manipulator are known from the prior art, e.g. from DE 39 05 780 C1 and DE 10 2005 052353 A1. Rack-type magazines having rigid accommodation means and a removing device which can be controlled for removing the tools are also known from the prior art, e.g. from DE 10 334 346 A1, and usually have a higher tool storage capacity and a set-up area which is more compact compared to chain magazines. Furthermore, DE 10 2009 008 647 A1 describes a tool change system where the tools are stored at different levels inside the tool magazine in accommodation compartments which are arranged along a circular arc.

In order to reduce the production times, it is advantageous to accomplish all provisioning and storage operations in the shortest possible time. As a result, the auxiliary process times of a processing operation, i.e. the times where no change in shape is achieved on the workpiece although indirect advances with respect to the order are made, are reduced and the production can be economized. However, in connection with the above mentioned tool magazines it is often impossible to avoid that, while the tools are provided or resorted, the machine tool has already concluded the processing step performed on the workpiece and requires the next tool. If the provisioning periods of the tool magazine are too long, idle times result for the machine spindle, thus leading to a loss with respect to the auxiliary process time.

Furthermore, it is disadvantageous that, while a tool magazine is additionally loaded, no tool can be provided at a loading station, and therefore loading operations of this type can result in a loss with respect to the auxiliary process time.

In fact, the number of required loading operations on the tool magazine can be reduced by an increase in the tool storage capacity of the tool magazine, i.e. the number of available tool storage areas. However, magazines having many tool areas usually need a relatively large set-up area which is often limited in particular in the direct vicinity of the tool spindle. With increasing tool magazine dimensions, the average tool provisioning times increase as well.

DE 101 63 294 A1 discloses a tool change system which comprises a tool magazine and a tool changer which is designed as a temporary storage. However, this system is likewise limited with respect to the tool transport capacity.

SUMMARY OF THE INVENTION

Therefore, an object of the invention is to provide a system and a method for providing tools on a machine tool as well as a machine tool which is used for processing a workpiece and includes a tool change system, wherein the above mentioned problems of the tool magazines known from the prior art have been solved.

In particular, a further object of the invention is to provide a system and a method for supplying and changing tools on a machine tool, which both avoid long auxiliary process times and are characterized by an increased handling speed of the tools.

The above described objects are achieved according to the invention by a system for providing tools on a machine tool, a machine tool having a tool change device, and a method for providing tools as described herein. Preferred exemplary embodiments of the invention are described herein.

A system for providing tools on a machine tool according to the present invention comprises a first tool magazine for accommodating a plurality of tools and a first feeding device which is adapted to remove tools from the first tool magazine and feed them to the machine tool by moving the tools after removing them from the magazine and feeding them to the spindle. The system also comprises at least one second tool magazine for accommodating a plurality of tools and a transfer apparatus adapted to feed tools removed from the second tool magazine to the first tool magazine, with the result that the second tool magazine serves as a supply magazine for the first tool magazine.

Due to the inventive combination of a first main magazine and at least one second supply magazine which can supply the first magazine with tools, the loading of the two tool magazines during the operation can always be adapted to the processing operations of the tool spindle in optimum fashion. This enables a space-saving compact design of the first tool magazine which can thus be positioned close to the tool spindle to be loaded and enables short feed travels during the tool change. Tools which are not stored in the first tool magazine can be supplied in addition from the second tool magazine in a flexible way as required.

The first feeding device preferably also comprises a tool changer which removes tools from the work spindle and inserts other tools into the work spindle.

It is preferred for the system to also comprise a second feeding device which is adapted to remove tools from the second tool magazine and provide them at a predetermined transfer position.

The first and second tool magazines are preferably made in such a way that they are operated independently and optionally at the same time, wherein the first feeding device can feed tools from the first tool magazine to the machine tool and/or can return them to the latter, while e.g. the second feeding device provisions a tool at the predetermined transfer position or stores a tool fed from the first tool magazine in the second tool magazine. According to an advantageous embodiment, it is also possible for the transfer apparatus to transport tools from the second tool magazine into the first tool magazine and/or back while the first feeding device feeds tools from the first tool magazine to the spindle. In addition, a loading operation or a tool provisioning operation can simultaneously be carried out at the second tool magazine. Down times of the tool spindle resulting from the additional loading and/or reloading of the tools in the tool magazine can be avoided by such a decoupling of the functioning of the first and second tool magazines so as to reduce the auxiliary process times.

In addition, the handling speed (manipulation speed) of the tools, in particular of the number of tools moved per unit time, can be decisively increased with respect to prior art systems.

A further advantage of the invention is that the combination of two tool magazines offers the possibility of carrying out the tool fracture monitoring, the taper cleaning or the tool identification optionally in both the first and second tool magazines. The second tool magazine is preferably adapted to carry out the tool fracture monitoring, the taper cleaning or the tool identification in such a way that they can take place e.g. at the same time as a tool change carried out by the first tool magazine to further reduce the auxiliary process times.

In this context, the terms "feeding device" and "transfer apparatus" according to the invention are understood to refer to the function. It is advantageous for the transfer apparatus and the first feeding device to be structurally designed as a module, by means of which tools are moved between the first tool magazine and the spindle and by means of which tools are moved between the first tool magazine and the second tool magazine. The transfer apparatus here preferably takes tools provided at a predetermined transfer position by the second feeding device or the transfer apparatus provides the second feeding device with tools removed from the first tool magazine at a predetermined transfer position. In other words, the first feeding device is used in this case as a transfer apparatus to feed tools from the second tool magazine to the first tool magazine and/or to return tools from the first tool magazine into the second one. According to this embodiment, the first feeding device has a dual function to avoid the provisioning of a separate transfer apparatus: It performs the tool change on the spindle and optimizes the tool loading of the two tool magazines in such a way that the tools required on the workpiece on account of the predetermined processing steps are provided promptly in the first tool magazine. The first feeding device is preferably adapted to exchange tools between the first and second tool magazines while the workpiece is processed on the spindle so as to further reduce the auxiliary process times.

However, it is also possible to use an additional feeding device as a transfer apparatus, said feeding device being adapted to feed tools stored in the second tool magazine to the first magazine and vice versa.

It is also possible for the transfer apparatus and the second feeding device to be made as a module, by means of which tools are removed from storage areas of the second tool magazine and are moved between the second tool magazine and the first tool magazine to exchange tools between the second tool magazine and the first tool magazine.

A further advantage of the invention is that the transfer apparatus can also be adapted to feed tools from the second tool magazine directly to the machine tool. The possibility of feeding tools from the second tool magazine optionally directly to the machine spindle or initially to the first tool magazine for intermediate storage, increases the flexibility in the tool provisioning so as to avoid a "bottleneck" at the first tool magazine and, depending on the production flow and the required tool sequence, to choose the tool provisioning strategy enabling the optimum production flow. If the transfer apparatus and the second feeding device are made as a module, the feeding device of the second tool magazine, e.g. the manipulator of a matrix magazine, can advantageously also be adapted to feed tools from the second tool magazine optionally directly to the machine spindle or to the first tool magazine for intermediate storage.

It is especially advantageous for the transfer apparatus to be adapted to optimize the loading of the two tool magazines by an exchange of tools between the first and second tool magazines in such a way that in each case the tools required for the next n processing steps (n≥1) on the spindle are available in the first tool magazine. Depending on the type and storage capacity of the tool magazine, the value for n can be determined e.g. in such a way that during the next n processing steps it is also possible to carry out a loading step of the second tool magazine on the workpiece. The advantage is that also during a loading step of the supply magazine during which no tool exchange is possible with the first tool magazine, no losses result with respect to the auxiliary process times. As a result, there are no waiting times on the tool spindle since all tools required for the next n processing steps are available in the first tool magazine.

In an advantageous embodiment, the second tool magazine has a higher tool storage capacity, i.e. the number of storage areas for accommodating tools, than the first tool magazine. It is preferred for the number of storage areas in the first tool magazine to be more than four, preferably more than eight. It is preferred for the number of storage areas in the second tool magazine to be more than 20, preferably more than 40. For example, the first tool magazine can be carried out with a more compact space than the second tool magazine and can be positioned as close as possible in the often confined production space in front of the tool spindle. The larger, second tool magazine which is coupled to the first fool magazine by means of the transfer apparatus can then be placed at a greater distance from the tool spindle, preferably in the vicinity of the first tool magazine. This enables a better space efficiency and a greater flexibility as regards the arrangement of the tool change system and a simultaneously high overall tool storage capacity of the system and short feed travels during a tool change on the spindle.

In a further advantageous embodiment, the average tool provisioning time of the first tool magazine is shorter than that of the second magazine. The term 'average tool provisioning time' is understood to mean the average period of time required to remove a tool from a storage area of the tool magazine and feed it to a predetermined transfer position on the spindle, preferably the spindle accommodation position. By combining a fast first tool magazine and a slower second tool magazine which preferably has a greater tool storage capacity instead, the auxiliary process times of the tool change system are kept as short as possible. For example, the first tool magazine can be used as a fast access magazine and the second tool magazine can be used as a background magazine. The advantages of the invention can be implemented in particular when the tool storage capacity of the first tool magazine is smaller than that of the second one and the average tool provisioning time of the first tool magazine is shorter than that of the second one.

According to a further advantageous embodiment, tools are provided in a first transfer position, a second transfer position and optionally also in an accommodation position on the spindle in such a way that the longitudinal axes of the tools are oriented in these positions in a horizontal alignment and parallel to one another. In this connection, the first and/or second transfer positions are the tool provisioning positions where a tool of the first and/or second tool magazine is transferred to the feeding apparatus and/or the transfer apparatus. The longitudinal axis of the tools can coincide with the taper axis of the tool hollow shank taper or the tool steep taper, for example. This enables an exchange of tools between the first and second tool magazines and the feeding of tools from both the first and second tool magazines to the tool spindle with short, fast travels. In this embodiment, all travels can be made along the same horizontal linear axis, preferably with only one feeding device, and without additional swivel movements of the tools.

The longitudinal axis of the tools preferably remains in horizontal alignment during a travel movement to feed the tool from the predetermined transfer position of the second tool magazine to the first tool magazine. It is also preferred for the longitudinal axis of the tool to remain in horizontal alignment during a travel movement to feed the tool from the first tool magazine to the spindle.

In a further advantageous embodiment, the transfer apparatus feeds a tool accommodated in the second tool magazine to the first tool magazine by placing the tool on a predetermined transfer spot and feeding the placed tool from the transfer spot to the first tool magazine at a later date. As a result, the operation of the two tool magazines can be further separated, and therefore the tool placed on the transfer spot is only fed into one of the two tool magazines or to the tool changer and/or the spindle if this is required or if the exchange point in time is favorable. In this connection, the transfer spot is preferably arranged between the first and second tool magazines to obtain short travels and feeding times. Therefore, a transfer apparatus can also be understood to mean the cooperation of a first feeding device of the first tool magazine and a second feeding device of the second tool magazine, wherein the second feeding device is adapted to feed a tool stored in the second tool magazine to the first feeding device or to place it on a transfer spot so as to feed the transferred or stored tool to the first tool magazine.

The inventive combination of the at least two tool magazines is not limited to a special form of a particular type of tool magazines.

A first tool magazine used according to the invention is preferably a tool magazine where the tool can be moved in its stored position in the magazine e.g. to a transfer position for transferring the tool to the feeding device and/or transfer apparatus without being removed from the magazine, such as a wheel-type or chain magazine.

The second tool magazine used according to the invention is preferably a tool magazine where the tool remains stationary at its stored position, such as a rack-type or matrix magazine, which can be equipped with a magazine-inherent manipulator which functions as a feeding and/or transfer apparatus.

The advantages of the invention can be realized in particular when the first tool magazine is made as a wheel-type magazine where tools are stored in a radial direction. A wheel-type magazine including radially stored tools has a minor overall width and short tool provisioning times. In this connection, the wheel-type magazine can advantageously be dimensioned in such a way that the tool to be removed is arranged in the removal position parallel and/or in a horizontal plane with a tool accommodated in the work spindle. This has the advantage that the tool must then be moved exclusively or almost exclusively in a horizontal fashion by the feeding device to be fed to the work spindle.

In a further advantageous embodiment which can be implemented as, a wheel-type or chain magazine, for example, the tools are held in the first tool magazine in tool holders along the periphery of the first tool magazine in such a way that the longitudinal axes of the tools lie in a plane and protrude beyond the circumference of the first tool magazine, and the tools can be moved along the circumference of the first tool magazine. This arrangement enables a space-saving design of the first tool magazine, the width of which being substantially determined by the width of the tools.

The tools are preferably moved within the plane in which the longitudinal axes of the tools lie. The tools are preferably received in the tool holders at a first end region of the longitudinal axes thereof, i.e. at a first longitudinal end, and therefore a second, opposite end region, i.e. the opposite longitudinal end of the tools, protrudes outwardly or inwardly. In this position, the tools are locked. In other words, the tools are only held at an end point along the circumference of the tool magazine. Such a design of the first tool magazine enables a particularly light-weight and narrow design of the tool magazine and simultaneously a high tool density and can thus be positioned as close as possible to the work spindle.

In order to be able to arrange the tools as close as possible to the circumference, the tools preferably protrude externally or internally beyond the circumference of the first tool magazine in such a way that the longitudinal axes thereof form a normal vector in relation to the circumference of the first tool magazine. In other words, in the longitudinal direction the tools are preferably arranged orthogonally to the outer circumferential line of the tool magazine, and therefore the longitudinal axis of the tools is perpendicular to the tangential vector at the point where the tool is held along the circumference at the tool holder.

The longitudinal end of the tools, which is not mounted on the circumference of the first tool magazine, preferably protrudes outwardly. The radial tool arrangement protruding beyond the outer circumference of the wheel-type magazine also provides enough space for tools, the tool body of which has a greater diameter, and makes optimum use of the external space outside the outer circumference of the first tool magazine.

The first feeding device is preferably arranged laterally and externally with respect to the first tool magazine. As a result, the externally arranged first feeding device for removing the tools from the tool magazine can be moved advantageously along a linear travel axis between both the first tool magazine and the spindle of the machine tool and also between the first and second tool magazines. In connection with the rotatable first tool magazine which can provide the required tool at a predetermined removal position, this results in short, simple travels for the feeding device.

The first tool magazine is preferably arranged on the machine tool in such a way that the plane of the longitudinal axes of the tools is perpendicular to a bottom surface and extends substantially parallel to a plane of a bed and a column of the machine tool. In other words, the flat tool magazine is upright and can thus be arranged along the longitudinal side of a machine tool. This enables a particularly compact overall width of a system consisting of a machine tool and the tool change system according to the invention since the width of the first tool magazine is not determined by the diameter thereof, as is the case in conventional, horizontal systems, but substantially by the tool width since they are arranged in the longitudinal direction in a plane and are attached to the outer circumference of the tool magazine without compartments or other bulky holders.

In an advantageous embodiment, the second tool magazine is made as a matrix magazine or a rack-type magazine. The combination of wheel-type magazine and a matrix or rack-type magazine is particularly advantageous since the wheel-type magazine enables fast tool provisioning times and simultaneously a narrow design, and the supply magazine in the form of a matrix or rack-type magazine has a high tool storage capacity and can supply the wheel-type magazine with the required tools.

The second tool magazine is preferably made in such a way that it can be loaded in sets and/or simultaneously with the production time. The set-wise loading preferably uses loading cassettes, and therefore a whole set of tools stored in loading cassettes is changed in a change operation. In the loading operation, the tools are removed from/placed into the cassettes before or after the loading operation whereas, when only one conventional tool change system having a tool magazine is used, no tool can be provided on the machine. As a result of the inventive combination of a first tool magazine with a second, set-wise loadable supply magazine it is, however, possible to carry out a set-wise loading operation without having to interrupt the processing in the machine spindle.

The present invention also provides a tool magazine which is made in such a way that the tools are held horizontally in the magazine and can be placed into or taken from the tool magazine by a horizontal translational motion. The horizontal mount avoids an additional swivel movement when the tools are fed to the spindle as necessary in the case of vertically suspended tools.

This tool magazine is especially suited to be used as a second tool magazine in the above described sequence. However, it is not limited thereto and, even if used as the only tool magazine, also yields a number of advantages over conventional tool magazines, as becomes evident from the below description. In this respect, this tool magazine represents an independent aspect of the invention, for which separate protection might also be sought, if necessary. In a horizontal storage in this tool magazine according to the invention, in which the tools can be removed from the tool magazine by a horizontal translational motion, an additional vertical lifting movement can be avoided when the tools are stored and/or removed, which saves additional time during the tool changing operation. In conventional rack-type magazines, the tools are held in kind of tool claws in the tool magazine, and therefore a vertical lifting movement is necessary for removing the tools to release the tools from the claws and then remove them in a horizontal movement from the mount.

In a particularly advantageous embodiment, the tools are held in the tool magazine in a receptacle. Tools, the maximum outer diameter of which is smaller than the inner diameter of the receptacle, are preferably slid into the receptacle by means of a horizontal placing movement and placed for storage. Tools, the maximum outer diameter of which is larger than the inner diameter of the receptacle, are accommodated in the receptacle by means of the standardized tool end region, e.g. the hollow shank taper, while the opposite part of the tool having the large outer diameter protrudes laterally from the receptacle. The receptacle protects the tools from dirt. In addition, it enables a simple adaptation of e.g. a rack-type magazine to certain tools by representing kind of an intermediate accommodation which can be refitted in the case of a rack-type magazine and supplements it so as to accommodate further tool forms.

According to a further advantageous embodiment, the tools are held by means of a ball catch in the tool magazine. The ball catch advantageously comprises a hollow plate having a circular recess, along which ball clamp connections are arranged along the circumferential side. A ball clamp connection comprises a hardened steel ball which is held by one or more cup springs and protrudes into the recess by means of a partial ball surface. When the workpiece is slid into the recess, the hardened steel balls of the ball catch move along the workpiece taper until they lock into the gripper groove of the standardized tool taper and hold the tool in this position in frictional and positive engagement. Therefore, the tools held by the ball clamp connections can be removed by means of a horizontal gripper movement. The economization of an additional vertical lifting movement in the removal or storage of the tool enables a more compact arrangement density of the tools in the magazine since the space which was formerly required for the lifting movement can now be saved.

According to a further aspect, the invention relates to a system for providing tools on a machine tool with a spindle. The system comprises a first tool magazine for accommodating a plurality of tools; a first feeding device which is adapted to remove tools from the first tool magazine and feed them to the spindle; at least one second tool magazine for accommodating a plurality of tools; and a transfer apparatus which is adapted to feed tools removed from the second tool magazine to the first tool magazine, with the result that the second tool magazine serves as a supply magazine for the first tool magazine, and is also adapted to feed tools removed from the second tool magazine directly to the spindle. The dual function of the transfer apparatus which can also feed tools from the second tool magazine directly to the spindle thus reliably prevents a bottleneck on the first tool magazine. The first feeding device and the transfer apparatus are preferably made as a structural module.

According to a further embodiment, the feeding device of the first and second tool magazines and the transfer apparatus are made as a structural module. It is thus possible to directly remove tools from the storage areas of both the first and second tool magazines by means of only one feeding device and then optionally feed them directly to the spindle or to the other tool magazine. Of course, the system can here also be made advantageously with all further, above described design features. For example, it is particularly advantageous for the first tool magazine to be arranged closer to the spindle than the second tool magazine and for an average tool provisioning time of the first tool magazine to be shorter than an average tool provisioning time of the second tool magazine, and therefore a tool stored in the first tool magazine can be removed more quickly from its storage area than a tool stored in the second tool magazine and can be fed to a predetermined tool provision position.

A machine tool for machining a workpiece according to the present invention comprises a tool change device for changing a tool on the machine tool by means of a system according to the invention for providing tools on the machine tool as described above. The second tool magazine is advantageously arranged on the first tool magazine in such a way that the travel of the tool from the first tool magazine to the machine spindle is shorter than the travel of the tool from the second tool magazine to the machine spindle. In other words, the distance of the second tool magazine from the tool spindle is larger than the distance of the first tool magazine from the tool spindle. The distance of a tool magazine to the tool spindle is understood to mean the average travel of a tool from the tool magazine to the tool spindle.

The invention also relates to a method for providing tools on a machine tool, wherein tools are fed from at least two different tool magazines to a machine tool. The method comprises the following steps: providing a plurality of tools in a first tool magazine; providing a plurality of tools in at least one second tool magazine; moving and feeding the tools from the at least two different tool magazines to the machine tool by means of a transfer apparatus and/or a feeding device, wherein a tool which is stored in the second tool magazine and which is required on the machine tool at a predetermined tool change time, is fed from the transfer apparatus to the first tool magazine in a first step before the predetermined tool change time and is removed in a second step from the first tool magazine by means of the feeding device, is moved and fed to the machine tool.

BRIEF DESCRIPTION OF THE DRAWINGS

FIGS. 9A and 9B show a side view and a front view of a tool receptacle according to an exemplary embodiment of the invention.

DETAILED DESCRIPTION OF THE DRAWINGS AND PREFERRED EXEMPLARY EMBODIMENTS OF THE PRESENT INVENTION

Preferred embodiments of the present invention are described in more detail below by way of example and in exemplary fashion with reference to the enclosed drawings.

Figure 1:
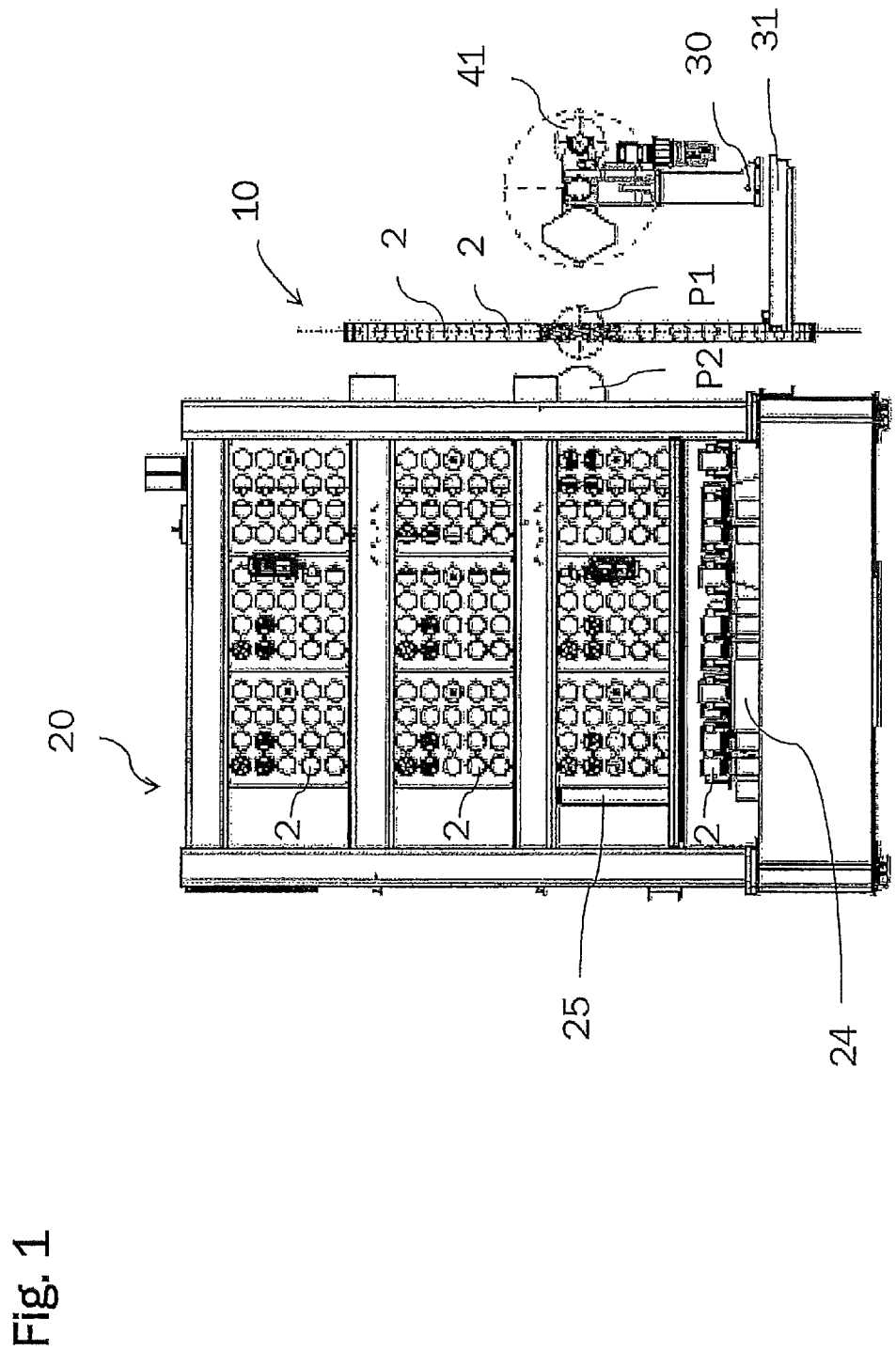
FIG. 1 shows a front view of a system for providing tools according to an exemplary embodiment of the invention.

FIG. 1 shows a front view of an embodiment of the system according to the invention for changing and providing tools on a machine tool, wherein the first tool magazine is made as a wheel-type magazine 10 and the second tool magazine 20 is made as a matrix magazine. The tool magazines 10 and 20 store a plurality of tools 2 and provide them, if required, to the tool spindle 41 of a machine tool or receive a tool 2 which is no longer required by the tool spindle 41 for storage. The wheel-type magazine 10 and the matrix magazine 20 can be loaded with all common tools 2 for the non-cutting and cutting production. Only the tool spindle 41 of the machine tool is shown in FIG. 1 to elucidate the inventive principle.

The wheel-type magazine 10 is upright, i.e. the circumferential line, along which the radially arranged tools are moved by turning the wheel-type magazine covers a plane which is perpendicular to the bottom contact area of the tool magazine 10. This enables a particularly narrow design of the first tool magazine 10 since the width of the wheel-type magazine 10 is essentially determined by the tool width. As a result, the wheel-type magazine 10 can be positioned close to the tool spindle 41. This enables short feed travels to the tool spindle 41 and thus short tool change times.

In order to feed tools 2 from the wheel-type magazine 10 to the tool spindle 41, the wheel-type magazine 10 is turned into a position where a tool 2 stored and required in the wheel-type magazine 10 is provided at a predetermined transfer position P1. At this transfer position P1, the required tool 2 can be removed by a feeding device 30 by means of a tool double gripper. For this purpose, the feeding device 30 travels along a linear axis 31 up to the transfer position P1 where it removes the tool from the tool magazine 10, travels along the linear axis back to the spindle 41 and provides the spindle with the tool 2 for carrying out a tool change. Further design details of the wheel-type magazine 10 are described in FIG. 4.

On the side of the wheel-type magazine, which is opposite to the tool spindle 41, a matrix magazine 20 is arranged as a supply magazine for the wheel-type magazine 10. The distance of the matrix magazine 20 from the spindle 41 is thus larger than that of the wheel-type magazine 10. In the present embodiment, the matrix magazine can accommodate up to 500 tools. Compared to the wheel-type magazine 10 which, depending on the design, can be loaded with 24, 40 or 80 tools, for example, the tool storage capacity of the rack-type magazine 20 is thus considerably higher. In the exemplary embodiment as shown, front and rear levels 25 of the matrix magazine 20 can be loaded with a maximum of 180 tools each. In addition, several tool cassettes having a total of 140 slots can be stored in the lower level 24. The matrix magazine 20 has two orthogonal linear axes 21, 22 shown in FIG. 2 and FIG. 3 in the vertical and horizontal directions, along which a second feeding device 23 can be moved. The second feeding device 23 can be driven in such a way that it can approach the storage position of a tool 2 stored in the matrix magazine 20, where it takes the tool 2 from the storage position and supplies it to a predetermined transfer position P2. This transfer position P2 is disposed on an outer edge of the matrix magazine 20 which faces the wheel-type magazine 10.

The tool change system shown in FIG. 1 also comprises a transfer apparatus which is adapted to feed tools 2 accommodated in the second tool magazine 20 to the first tool magazine 10 in such a way that the second tool magazine 20 serves as a supply magazine for the first tool magazine 10. In the present exemplary embodiment, the feeding device 30 which feeds the tools to the tool spindle additionally also serves as a transfer apparatus to feed tools from the matrix magazine 20 to the wheel-type magazine 10. For this purpose, the matrix magazine 20 and/or the transfer position P2 is positioned at the first tool magazine 10 in such a way that the transfer position P2 of the matrix magazine 20 can be achieved by moving the feeding device 30 along its linear axis 31. The distance between the transfer position P1 on the wheel-type magazine 10 and the transfer position P2 of the matrix magazine 20 is preferably as small as possible so as to be able to carry out the feed motions of the feeding device by means of short travels.

In order to feed a tool from the second tool magazine 20 to the first tool magazine 10, the second feeding device 23 of the matrix magazine 20 takes the required tool 2 from its storage position in the matrix magazine 20 by traveling along its linear axes 21, 22 and performs a feed motion to the transfer position P2. The feeding device 30 travels to the predetermined transfer position P2 where the second feeding device 23 provides the required tool 2 for removal. The feeding device 30 grips this tool and travels along its horizontal axis 31 back to the transfer position P1 at the wheel-type magazine 10. In the meantime, the wheel-type magazine 10 has already been turned into a position in which a free tool space is available at the transfer position P1. The feeding device 30 stores the tool 2 previously stored in the matrix magazine 20 in this free tool space. The tool change between the first and second tool magazines is preferably carried out when a processing operation is conducted on the machine spindle 41 and the feeding device 30 is not required for a tool change on the spindle 41.

Thus, the feeding device 30 fulfills a dual function in the present exemplary embodiment by being adapted to both feed tools from the wheel-type magazine to the spindle 41 for loading the latter and furthermore exchange tools 2 between the first and second tool magazines.

Due to the fully automated and program-controlled feed of tools to the tool spindle 41, the sequence of the tools required on the tool spindle 41 is known. The two feeding devices 30, 23 are thus also controlled in fully automated and program-controlled fashion. The first feeding device 30 is adapted to feed the tools 2, which are required on the spindle 41 for the next processing steps and which are not stored in the wheel-type magazine 10 but in the matrix magazine 20, to the wheel-type magazine before the required tool change time. Here, the feed motions of the second feeding device 23 and the feed motions of the first feeding device 30 are respectively matched with each other.

Likewise tools which are not required for the next manufacturing steps can be supplied from the first tool magazine 10 to the second tool magazine where they are stored. For this purpose, it is possible, in reverse of the feed motions from the second tool magazine into the first one, for the feeding device 30 to remove tools from the first tool magazine 10 and provide them to the transfer position P2 of the feeding device 23 of the matrix magazine. It is thus possible to continuously adapt the loading of the two tool magazines in always optimum fashion to the production flows during the production operation.

The combination of wheel-type magazine 10 and matrix magazine 20 thus enables an especially fast tool provision accompanied by reduced losses with respect to the auxiliary process times. While the wheel-type magazine positioned close to the spindle 41 as a rapid access magazine enables short tool provisioning times and short travels to the spindle 41, it is possible to sort and prepare tools 2 in the matrix magazine 20 as a "background magazine" having a high tool storage capacity parallel and in independent fashion from the tool change operations on the spindle 41 and, if required, feed them to the first tool magazine.

Furthermore, the required space of the combined tool magazine is small in the vicinity of the spindle since the larger matrix magazine can be positioned at a greater distance from the spindle 41 than the wheel-type magazine.

Furthermore, the matrix magazine 20 including an insertion technique is particularly suited to quickly remove from and/or add to the matrix magazine 20 complete tool sets by set-wise loading. The exemplary embodiment of FIG. 1 is shown by way of diagram once again in FIG. 3 in a side view.

Figure 2:
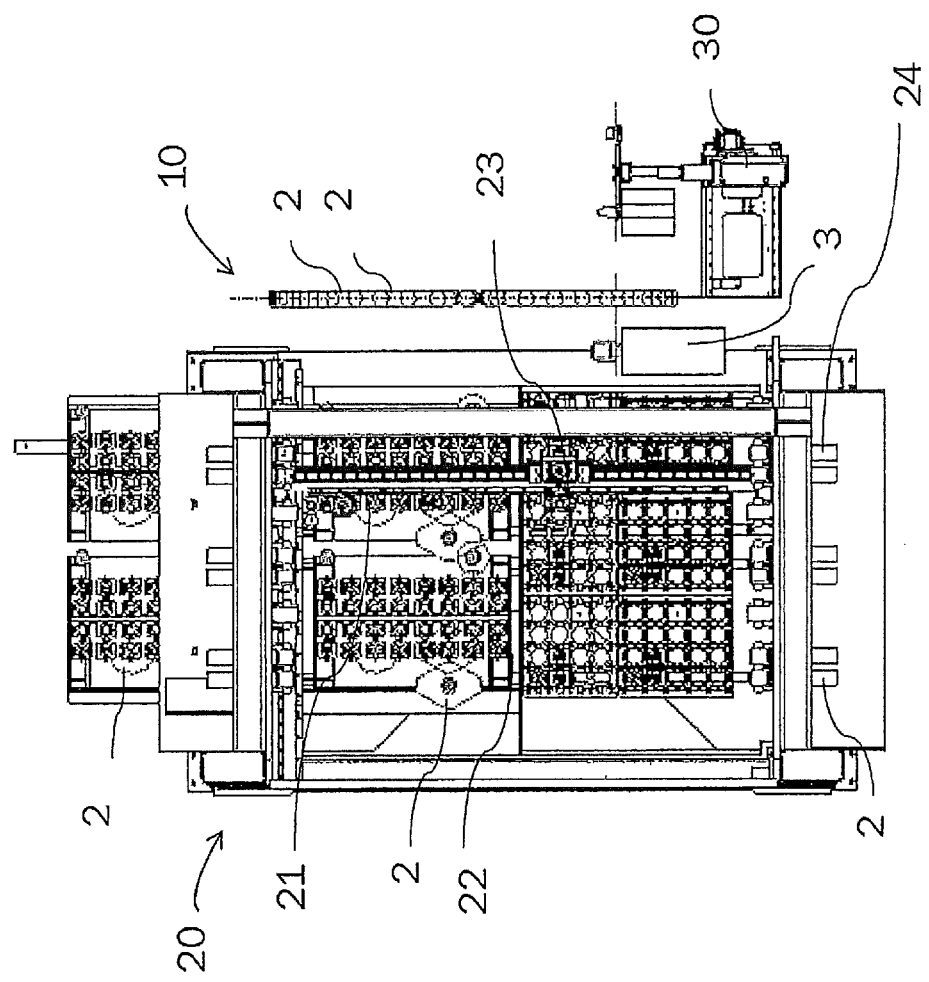
FIG. 2 shows a top view of a system for providing tools according to an exemplary embodiment of the present invention.

FIG. 2 shows a further exemplary embodiment of a top view of a system for providing tools. In this exemplary embodiment, a tool accommodated in the second tool magazine 20 is fed to the first tool magazine 10 by having the second feeding device 23 of the matrix magazine 20 perform a feed motion to place the tool 2 on a predetermined transfer spot 3 having a receptacle. The receptacle protects the tool from becoming dirty. The feeding device 30 travels along its linear axis to the transfer spot 3 where it removes the stored tool 2 from the receptacle and feeds it to the wheel-type magazine 10 in a second feed motion. The travel from the placement spot of the receptacle to the transfer position P1 at the wheel-type magazine is about 320 mm. The empty receptacle can either stay on the transfer spot 3 or be picked up by the feeding device 23 of the matrix magazine 20. By providing a delivery spot 3, the operation of the two tool magazines becomes even more independent with respect to each other since e.g. the feeding device 23 of the matrix magazine, which has removed a tool specific to the first tool magazine, does not have to wait at the transfer position P2 until the feeding device 30 takes it over. Having placed the tool on the transfer spot 3, the feeding device of the matrix magazine 20 can rather perform immediately further provisioning or sorting tasks in the matrix magazine 20. As a result, it is possible to reduce any waiting times.

The feeding device 30 is further adapted to feed, when required, tools from the matrix magazine 20 directly to the machine spindle 41. This prevents, e.g. in situations where a tool stored in the second tool magazine 20 must be rapidly fed to the spindle 41, the first tool magazine 10 from becoming a "bottleneck". Such situations can occur, for example, when a predetermined workpiece machining by manual interference of an operator is changed or an inspection operation on the workpiece requires a corrective work of the workpiece by means of another tool.

Figure 4:
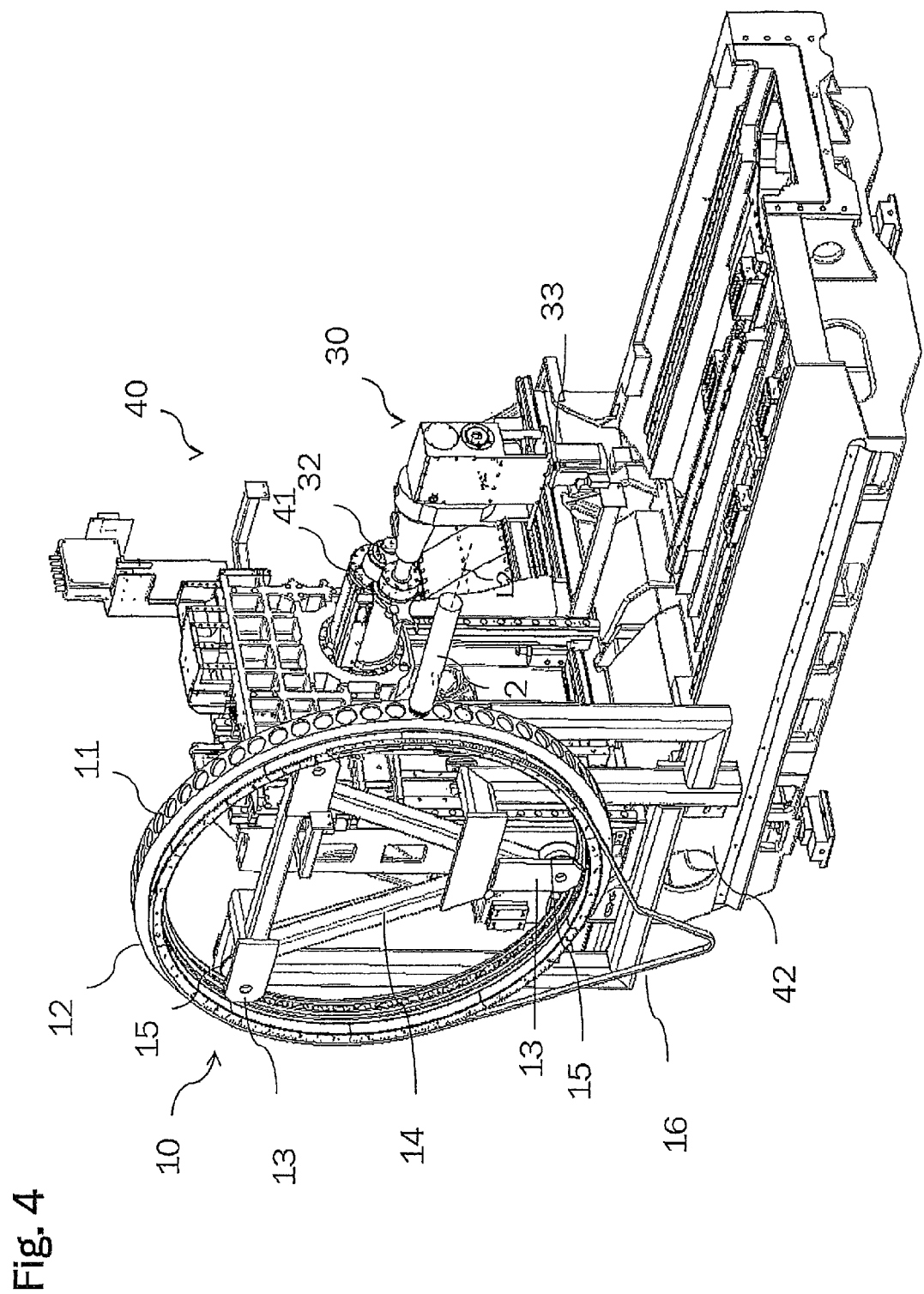
FIG. 4 shows a perspective view of an exemplary embodiment of the first tool magazine which is laterally arranged on a machine tool.

FIG. 4 shows the exemplary embodiment of the first tool magazine 10, which is made as a wheel-type magazine, in a three-dimensional visualization. The second tool magazine is not shown in this presentation. A plurality of tools can be kept in the annular wheel-type magazine 10 for tool provisioning. Here, the tools 2 are held at one of their end points along the circumference of the wheel-type magazine 10. For this purpose, tool holders 11 are disposed along the circumference of the wheel-type magazine 10 and are able to enter into a detachable connection to the tools 2. In FIG. 4, the tool holders 11 are implemented as an annular structure, which provide hole-like structures, which enables a particularly light-weight design. The tools are locked in the holders 11 on account of the centrifugal force and gravitational force. In the present example, an active lock is carried out in this connection by a snap-on connection to the tools where the tools are automatically locked in a positive engagement. In order to attach the tools 2 in the tool holders 11, a self-holding hollow shank taper with a planar abutment (HSK) as an interface (not shown in the figures). Alternatively, a steep taper or Morse taper can be used as well. The tools are thus only attached at one of their longitudinal ends to the outer circumference of the wheel-type magazine, and therefore the tools protrude radially outwards from the outer circumference of the wheel-type magazine in a radial direction. As a result, the longitudinal axis of the tools, which is illustrated by a dashed line L2 in FIG. 4, lies in one plane. As a result, the tools can be arranged opposite to one another in an extremely compact and dense way along the circumference of the wheel-type magazine 10.

In order to elucidate the design principle, FIG. 4 only shows a loading with a tool 2. The wheel-type magazine is stored by means of a triangular frame 14, at the three end points 13 of which one wheel 15 each is arranged. Along with the here shown three-point mounting, a four or multiple point mounting is also possible. Instead of the triangular frame 14, it is, of course, also possible to support the wheel-type magazine by a central axis. The wheel-type magazine 10 is rotated in the present exemplary embodiment via a chain drive, wherein FIG. 4 merely shows the drive chain 16 by way of diagram. Instead of the here shown chain drive, the wheel-type magazine can also be driven directly via a pinion or via frictional engagement. An arrangement which is compact as possible is achieved when the wheel-type magazine 10 is attached laterally to the bed 42 and to the frame of the machine tool 40 in an upright position to enable short feed travels of the feeding device 30 to the spindle 41. As a result of this arrangement, the overall width of the wheel-type magazine 10 having a radial tool storage is substantially determined by the width of the tools 2, with the result that an especially narrow design can be implemented. The wheel-type magazine is attached above the bottom surface in such a way that the lower edge of the tools has a distance of 135 mm from the bottom surface when the tools are directly turned above the bottom surface, i.e. when the longitudinal axis of the tools is orthogonal to the bottom surface.

The longitudinal axis of the tool in the removal position in the wheel-type magazine is parallel and in a horizontal plane with the tool accommodated in the work spindle.

The feeding device 30 which is shown here by way of diagram comprises a horizontal linear axis 31 (not shown in FIG. 4), along which the feeding device which is driven by a drive unit 33 can be moved in a lateral direction relative to the wheel-type magazine to perform feed motions between spindle, transfer position P1 and transfer position P2. The distance between spindle and transfer position P1 is about 520 mm in the present exemplary embodiment. The travel unit for these feed motions has a double chain. The feeding device can also comprise a second horizontal axis which enables a travel in the radial direction relative to the circumference of the wheel magazine 10 to remove tools from the snap-on connections. According to a particularly advantageous embodiment, the feeding device 30 has a telescopic design for this purpose (not shown), and therefore its gripper arm can travel in a radial direction of the wheel-type magazine to remove a tool from the mount. In the exemplary embodiment as shown, the feeding device 30 is designed as a swivel-blade exchanger having a double gripper 32 to remove the tools, in order to simultaneously enable the accommodation of the last used tool 2 and the subsequently required tool 2 so as to enable a tool change with only one horizontal movement of the feeding device between spindle 41 and wheel-type magazine 10.

Figure 5B:
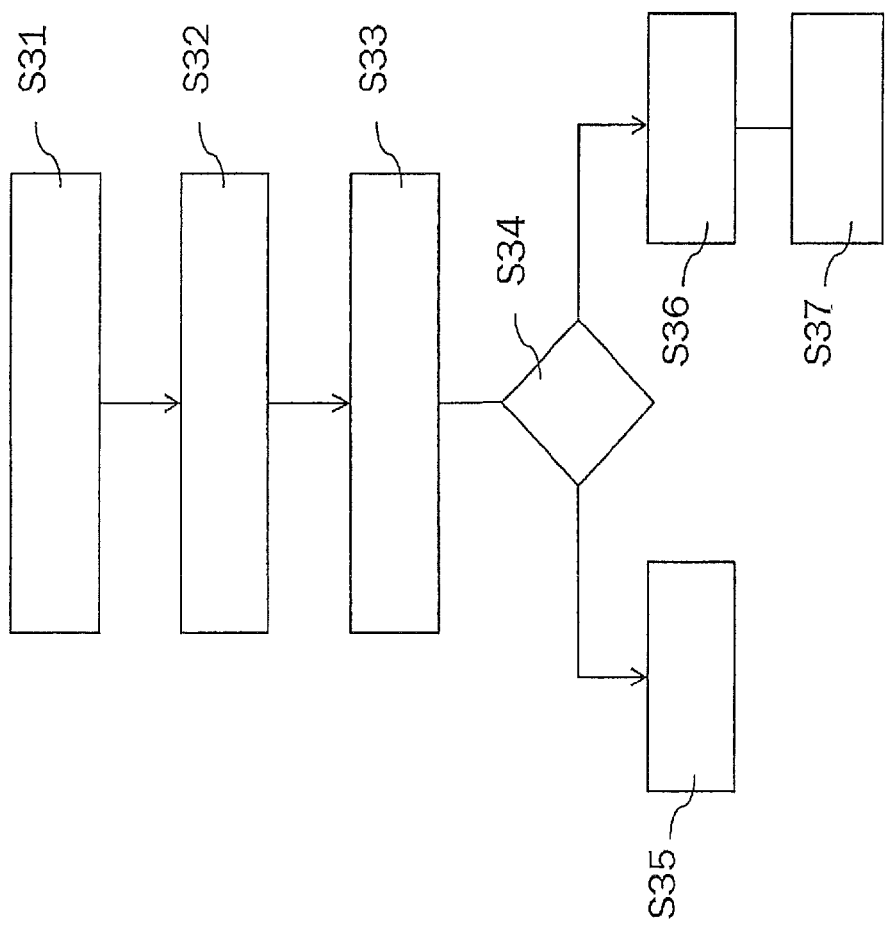
FIGS. 5A and 5B show a schematic flow diagram of a method for providing tools on a machine tool according to an exemplary embodiment of the invention.
Figure 5A:
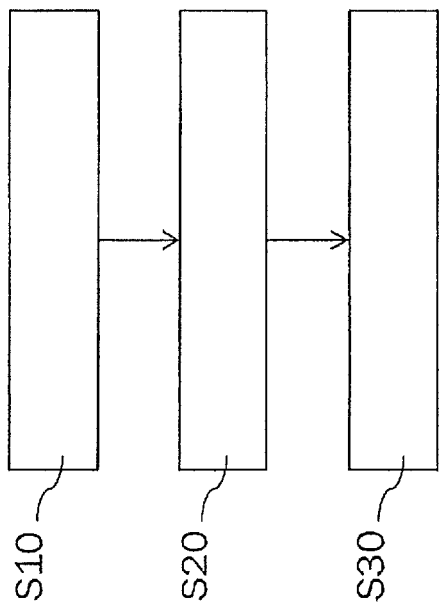

FIGS. 5A and 5B describe exemplary embodiments of the tool provision method according to the invention. In a first step S10, a plurality of tools is provided in a first tool magazine 10. In a second step S20, a plurality of tools is provided in at least one second tool magazine 20. In a third step S30, tools are fed to the machine tool 40 from at least two different tool magazines. Here, a tool which is stored in the second tool magazine 20 and is required on the tool machine 40 at a predetermined tool change time is fed to the first tool magazine 10 in a first step before the predetermined tool change time and fed from the first tool magazine 10 to the machine tool 40 in a second step.

The predetermined tool change time is the time which is determined on account of the predetermined processing sequence on the spindle and at which the required tool must be presented at the spindle.

A further exemplary embodiment of step S30 is illustrated in more detail in FIG. 5B. In the present exemplary embodiment, tools can also be passed on to the machine directly from the second tool magazine. In step S31, a tool is determined which is required on the spindle in one of the following processing steps. The tool processing operations on the machine spindle are made in fully automated and program-controlled fashion, and therefore the production method creates a tool sequence depending on the processing state of the workpiece, said sequence determining which tools 2 are required for the subsequent processing steps on the tool spindle 41. Step S32 then determines whether such a d tool Ti which is determined in such a way and is required in one of the subsequent processing steps, is stored in the first or second tool magazine. An optimum mode of provision is then determined in step S33.

For example, it is determined, if the tool Ti is stored in the second tool magazine, whether it is more advantageous to feed the required tool Ti directly from the second tool magazine 20 to the tool spindle 41 or to feed the tool Ti initially to the first tool magazine for the purpose of intermediate storage. A decisive criterion for the selection of one of the two above mentioned functions can be the shortest provisioning time, for example. Step S34 thus decides whether the tool Ti is directly fed from the second tool magazine to the spindle. If this is the case, the feeding device 30 directly provides the tool Ti to the tool spindle 41. Otherwise the tool Ti is fed to the first tool magazine 10 in an intermediate step S36 and is provided in step S37 from the first tool magazine 10 to the tool spindle 41 at a later time.

By means of the provisioning method according to the invention it is thus possible to implement any tool provisioning strategies. By combining two tool magazines, the tool loading of which can be optimized during the operation by an exchange of tools between the tool magazines, various combinatorial tool change strategies become possible and enable a much greater flexibility compared to conventional provisioning methods which are limited to only exchanging tools between the spindle and a tool magazine.

Figure 6:
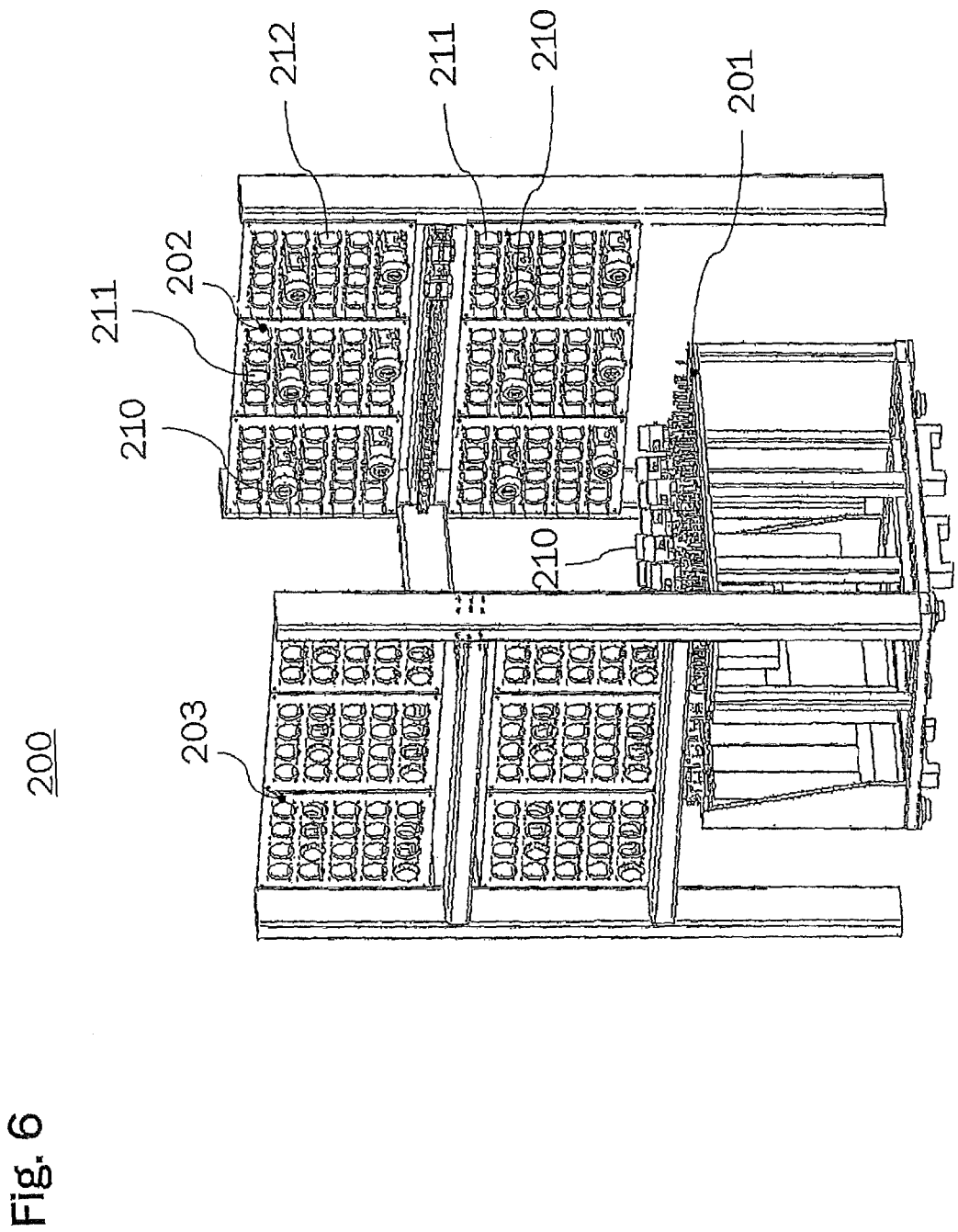
FIG. 6 shows a perspective view of a matrix magazine having receptacles according to an exemplary embodiment of the invention.

FIG. 6 shows a further advantageous exemplary embodiment of the second tool magazine 20. In order to achieve the highest possible tool capacity and the smallest dimensions, the tools in the tool magazine 200 are stored on three levels. In the exemplary example as shown, a front level 203 and a rear level 202 of the matrix magazine 200 can be loaded with horizontally stored tools in each case. In addition, further tools can be stored in a vertical alignment on the lower level 201. The tools can be stored in the tool magazine in a receptacle 210 which is illustrated in more detail in FIG. 7. The tool magazine has a hole structure 212 with circular recesses to hold the receptacles 210. The diameter of the circular recesses is adapted to the receptacle outer diameter in such a way that the receptacle 210 can be slid in positive engagement into the circular recesses. The tool magazine 200 also comprises a feeding device (not shown) having 3 linear axes orthogonal to one another, by means of which the tools can be removed from and/or stored in the storage spots again. The arrangement of the tools in up to three spatial planes enables a large tool storage capacity accompanied by a simultaneously small overall width of the tool magazine. Furthermore, short tool provisioning times are rendered possible on account of the short travel axes.

Figure 7:
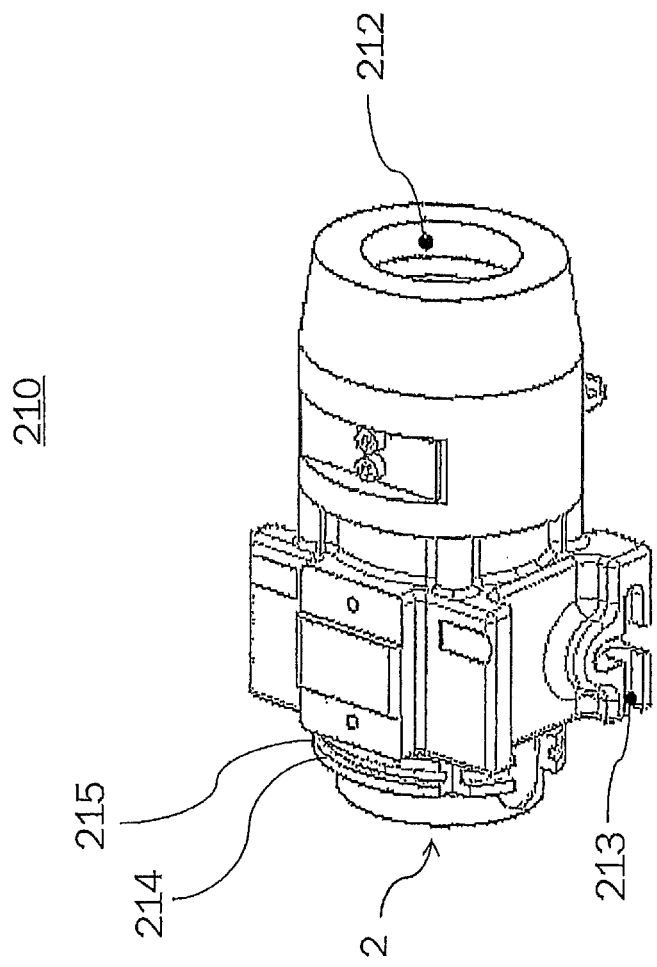
FIG. 7 shows a perspective view of a tool receptacle according to an exemplary embodiment of the invention.

FIG. 7 shows a perspective view of a receptacle 210 or cup for holding the tools in the tool magazine. In order to secure a tool 2 in the tool magazine, the tool can be slid into the tool receptacle 210 where it is stored so as to make an additional vertical storage movement unnecessary. As a result, the packing density in the tool magazine can be increased and simultaneously the tool provisioning time can be reduced since there are no additional vertical storage and/or handling movements. In FIG. 7, an end portion of the tool hollow shank taper 214 protrudes with a gripper groove 215 of the tool 2 beyond the receptacle 210. However, a storage of the tool magazine in the interior of the tool receptacle is only possible when the diameter on which the receptacle mounts are attached is larger than the tool outer diameter. The receptacle 210 comprises a mount 213 for mounting the receptacle. The opening 212 enables the access by the feeding device of the tool magazine. The receptacle 210 is mounted in a horizontal alignment in the tool magazine, and therefore the stored tools are also stored in a horizontal direction in the receptacle 210. Thus, they can be removed from the receptacle by means of a horizontal travel motion by the feeding device.

Tools, the outer diameter of which has such a large dimension that they cannot be accommodated in the receptacle, are only mounted on the receptacle by their standardized tool taper, and therefore the portion of the tool having a large outer diameter protrudes laterally beyond the receptacle. This is illustrated in FIGS. 9A and 9B. These relatively large tools are then released from the mount 217 in the tool magazine by means of a vertical lifting movement 225 similar to the conventional claw attachment 216. The storage possibilities for large tool diameters are designed in such a way that compared to the conventional claw variant lift can be saved since the storage bolts 217 do not extend to the center of the tool 2. As a result, space and time are saved in this variant as well.

Figure 8B:
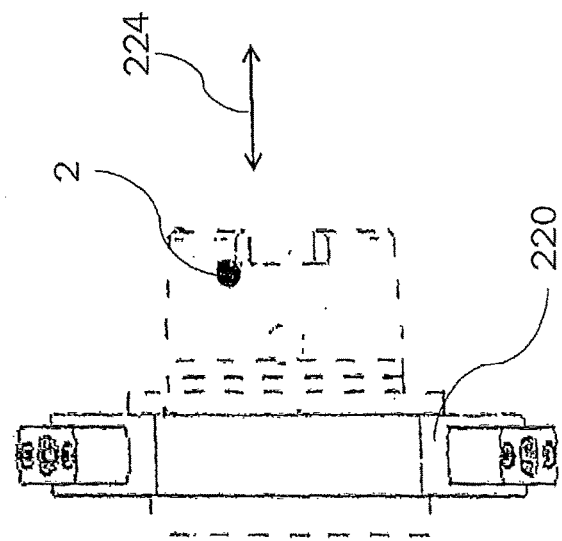
FIGS. 8A and 8B show a front view and a side view of a tool mount having a ball catch.
Figure 8A:
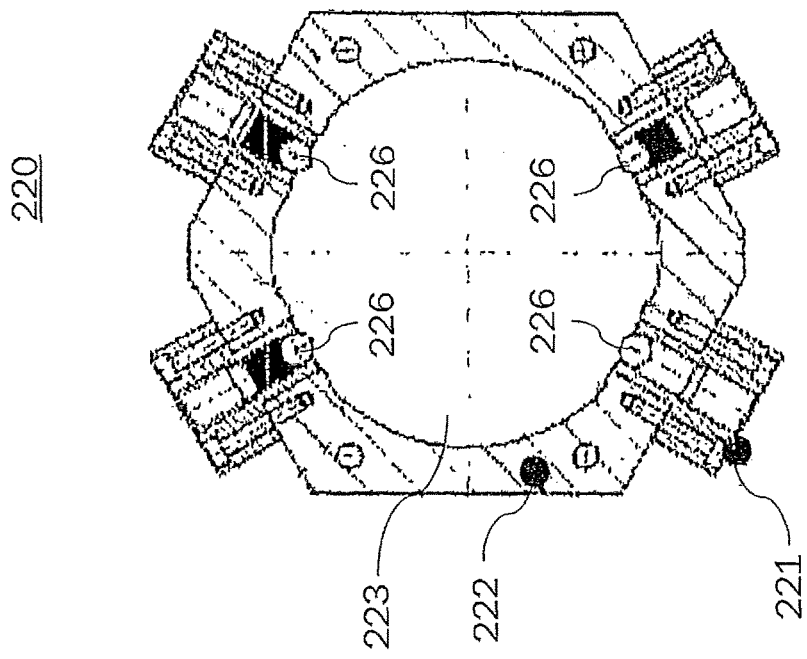

FIG. 8A and FIG. 8B show a further exemplary embodiment of a tool mount to store the tools in the tool magazine without any additional vertical lifting movement. In the present exemplary embodiment, the tool mount 220 comprises a tool base plate 222 having a circular recess 223 to accommodate the tools 2. Along the circumference, four ball catch connections 221 are attached to the base plate 222. A ball clamp connection 221 comprises a hardened steel ball 226 which is held by one or more cup springs and protrudes into the recess 223 by means of a partial ball surface. When the workpiece 2 is slid into the recess 223, the hardened steel balls 226 of the ball catch run along the tool tapers until they lock into the gripper groove of the standardized tool taper and hold the tool in this position. Therefore, the tools 2 held by the ball clamp connection 221 can be removed by a horizontal gripper movement. In FIG. 8B, the arrow 224 outlines the horizontal insertion direction of the tool 2 into the tool mount 220. A precondition for such a mounting mechanism is that the tool outer diameter is smaller than the groove outer diameter of the tool hollow shank taper. Since an additional vertical lifting movement is omitted when the tool is removed or placed, this renders possible a greater arrangement density of the tools in the magazine since the space which was formerly required for the lifting movement can now be omitted.

Figure 3:
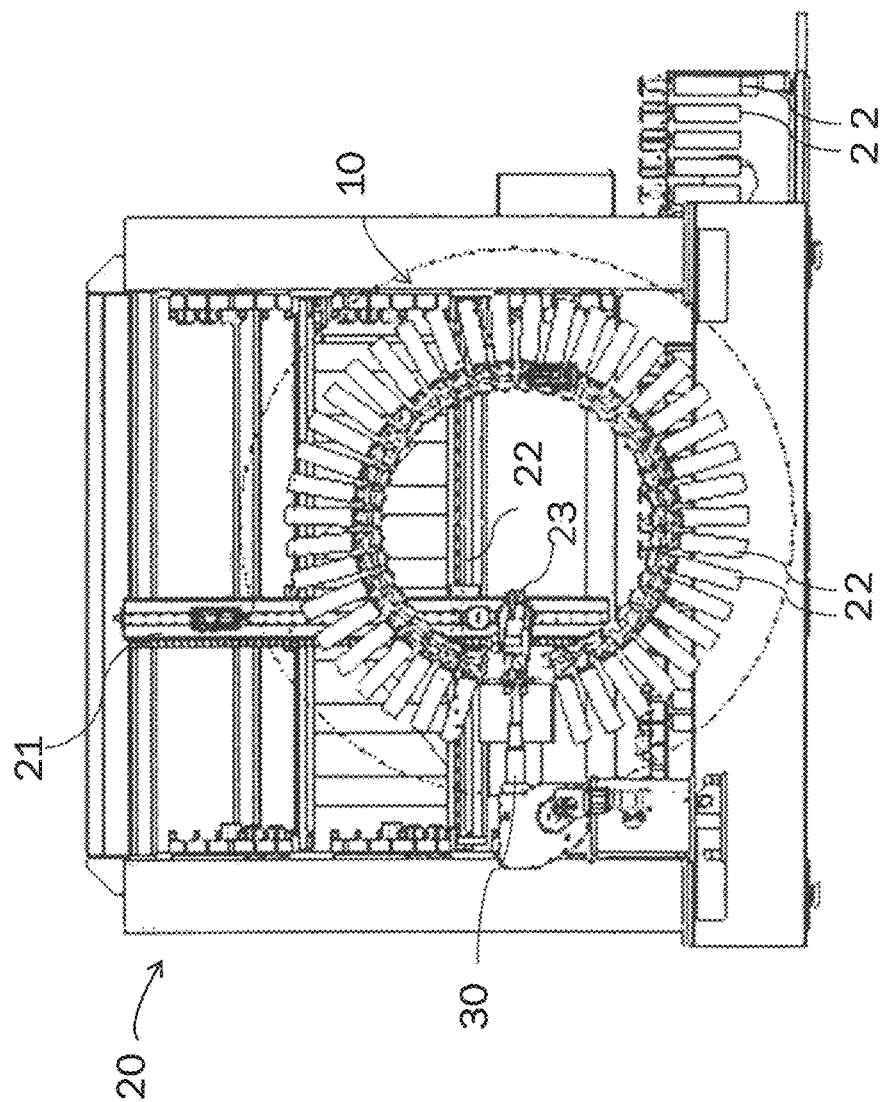
FIG. 3 shows a side view of a system for providing tools according to an exemplary embodiment of the present invention.
Figure 10:
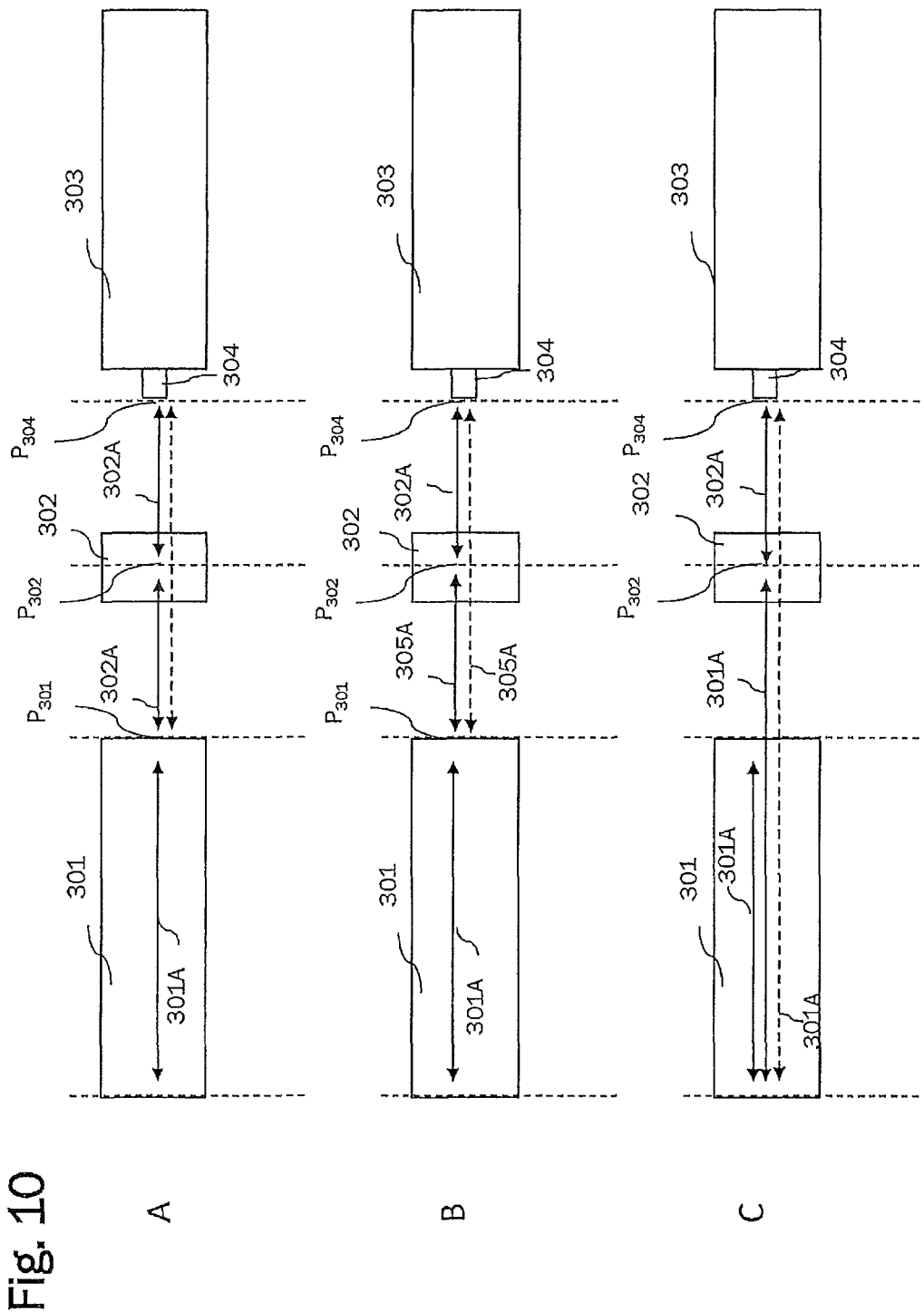
FIGS. 10 and 11 show further exemplary embodiments of the invention.
Figure 11:
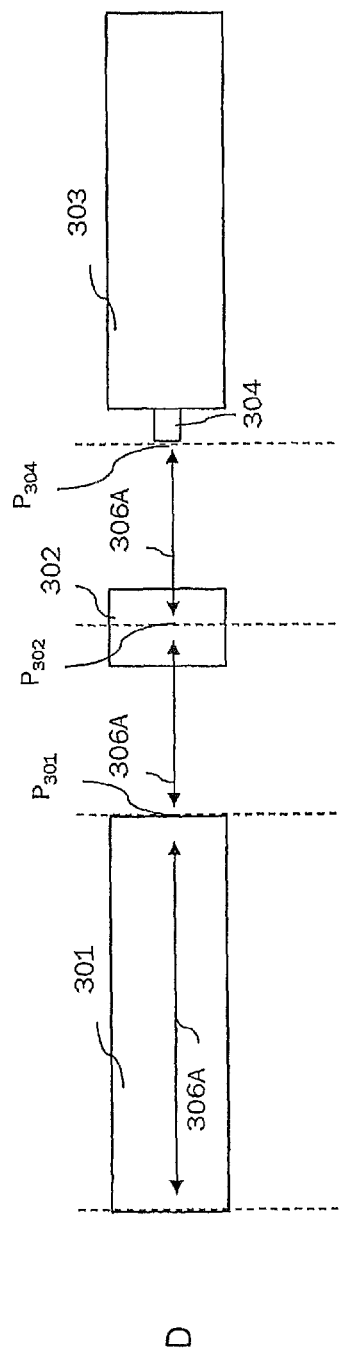

FIG. 10 shows three further exemplary embodiments A, B and C of a system and method for providing tools. In order to simply the illustration, the design details have been omitted in FIG. 10 to more clearly present the travels and transfer positions in the tool provisioning. It is self-evident that as shown in FIGS. 10 and 11 the tool magazine 301 is advantageously carried out as a matrix and the tool magazine 302 as a wheel-type magazine, as shown in FIGS. 1 to 3.

According to the exemplary embodiment marked by A the system and/or the method for providing tools comprises a machine tool 303 having a spindle 304 and two tool magazines 301, 302, which store tools required on the spindle 304. Each of the tool magazines has an independent feeding device 301A and 302A to remove tools from the storage positions of the respective tool magazine or store them therein. The first tool magazine 302 is disposed between the second tool magazine 301 and the spindle 304. The arrows mark the travels of the feeding devices 301A and 302A. According to the exemplary embodiment A, the feeding device 301A of the second tool magazine 301 performs travel movements within the second tool magazine 301A, e.g. along three linear axes (X, Y and Z axes) to remove tools from the second tool magazine 301 or store them on a storage spot in the magazine 301. The feeding device 301A provides the tools at the transfer position $P_{301}$. The transfer position can also be disposed outside the tool magazine 301, preferably on the outer edge of the tool magazine 301 which faces the first tool magazine 302.

In the present exemplary embodiment A, the feeding device 302A of the first tool magazine 302 performs a dual function by being adapted to feed tools from the first tool magazine 302 to the spindle 304 for loading the latter and also to exchange tools between the first 302 and second 301 tool magazines. These two feed motions are marked by the two arrows of the exemplary embodiment A, designated by 302A. The arrow 302A between the first 302 and second 301 tool magazines describes the function of the feeding device 302A as a transfer apparatus, which exchanges tools between the first 302 and second 301 tool magazines. For this purpose, the feeding device 302A travels to the transfer position $P_{301}$ to take up a tool provided by the feeding device 301A. Then, the feeding device 302A travels to the transfer position $P_{302}$ to store the tool in the first tool magazine 302. Furthermore, the feeding device 302A can travel between the transfer position $P_{302}$ and the transfer position $P_{304}$ to feed tools from the first tool magazine 302 to the spindle 304. This is shown by way of diagram by the second arrow 302A between the first tool magazine 302 and the spindle 304.

In a further advantageous embodiment, the feeding device 302A or the feeding device 301A can additionally be adapted to feed tools removed from the second tool magazine directly to the spindle 304 to avoid e.g. a bottleneck resulting at the first tool magazine 302. This travel is shown by the dashed arrow in FIG. 10, configuration A. The system shown in FIGS. 1 to 3 is a particular exemplary embodiment having a wheel-type and/or matrix magazine of configuration A in FIG. 10 without being limited to these structural designs.

Configuration B in FIG. 10 shows a further exemplary embodiment. Other than configuration A, a third feeding device 305A is provided which performs the tool exchange between the first 302 and second 301 tool magazines. For this purpose, the third feeding device 305A travels along a linear axis between the transfer positions $P_{301}$ and $P_{302}$. This travel is shown by way of diagram by the arrow denoted with reference sign 305A. An additional third feeding device 305A reduces the tool provisioning time, and therefore tools can already be exchanged between the first 302 and second 301 tool magazines while the feeding device 302A still travels to or from the spindle 304. In a further advantageous embodiment, the feeding device 305A can additionally be adapted to feed tools provided by the second tool magazine at the position $P_{301}$ directly to the spindle 304 so as to avoid a bottleneck by the first tool magazine 302, for example. This travel is shown by the dashed arrow in FIG. 10, configuration B.

Configuration C in FIG. 10 shows a further exemplary embodiment. Other than configuration A, it is not the feeding device 302A of the first tool magazine 302 but the feeding device 301A of the second tool magazine 301 that performs the dual function. For example, the feeding device 301A is adapted, on the one hand, to remove required tools from the storage spots of the second tool magazine 301 or to return them to the latter and to perform further common tool sorting tasks within the second tool magazine 301. Furthermore, the feeding device 301A is adapted to feed required tools for intermediate storage to the first fool magazine 302. For this purpose, the feeding device travels along a linear axis up to the transfer position $P_{302}$ where it places the tool in the first tool magazine 302. These travels of the feeding device 301A are shown by way of diagram by the arrows designated by the reference sign 301A.

In a further advantageous embodiment, the feeding device 301A according to configuration C can additionally be adapted to feed tools removed from the second tool magazine directly to the spindle 304 to avoid a bottleneck by the first tool magazine 302, for example. This travel is shown by the dashed arrow in FIG. 10, configuration C.

FIG. 11 shows a further exemplary embodiment D of a system and a method for providing tools. Modifying the exemplary embodiments illustrated in FIG. 10, the system having the two tool magazines 301 and 302 only has one feeding device 306A, the travels of which are shown by way of diagram by the arrows provided by reference sign 306A in FIG. 11. The feeding device 306A can remove tools from both the first 302 and second 301 tool magazines. The feeding device 306A can be moved along a linear axis between both the first 302 and second 301 tool magazines and also between the first tool magazine 302 and the spindle 304. Therefore, the feeding device 306A can feed tools from the first and second tool magazines directly to the spindle 304. In addition, the feeding device 306A is adapted to exchange tools between the first 302 and second 301 tool magazines, i.e. functions as a transfer apparatus. Of course, the tool magazines of the system shown here by way of diagram also have all the above described design features. For example, the second tool magazine 301 can be carried out as a matrix magazine having a high tool storage capacity and the first tool magazine 302 as a fast wheel-type magazine which is positioned closer to the spindle 304.

Therefore, the present invention can be adapted by the different configurations in each case in optimum fashion to the respective machine installation and the available travels and placing areas.

Of course, the individual features of the invention are not limited to the described combinations of features within the scope of the exemplary embodiments as presented. For example, the first and second tool magazines are not limited to a certain type (wheel-type magazine, shelf magazine, chain magazine, etc.). Furthermore, several tool magazines can be used and adapted correspondingly to serve as a supply magazine for a main magazine.

The invention claimed is:

1. A system for providing tools to a machine tool having a spindle, the system comprising:

a first tool magazine accommodating a first group of tools;
at least one second tool magazine accommodating a second group of tools;
a feeding device adapted to remove a given tool of the second group of tools from the at least one second tool magazine, the removed tool of the second group of tools being provided at a predetermined transfer position at the at least one second tool magazine; and
a transfer apparatus including a gripper configured to grip the removed tool of the second group of tools, the removed tool of the second group of tools being removed from the at least one second tool magazine by the feeding device and being provided at the predetermined transfer position, the transfer apparatus being adapted to feed the removed tool of the second group of tools, while the removed tool of the second group of tools is being held by the gripper, along a linear travel axis from the predetermined transfer position to the first tool magazine, with the result that the at least one second tool magazine serves as a supply magazine for the first tool magazine, the transfer apparatus also being adapted to feed the removed tool of the second group of tools, while the removed tool of the second group of tools is being held by the gripper, along the linear travel axis from the predetermined transfer position to a position along the linear travel axis at which the transfer apparatus inserts the removed tool of the second group of tools, by the gripper, directly into the spindle of the machine tool, the linear travel axis extending: (i) from the first tool magazine to the spindle of the machine tool, and (ii) from the first tool magazine to the at least one second tool magazine.

2. The system according to claim 1, further comprising another feeding device, which is adapted to remove a given tool of the first group of tools from the first tool magazine and feed the removed tool of the first group to the spindle of the machine tool, the another feeding device feeds the tools of the first group from the first tool magazine to the spindle and/or back, wherein the feeding device provides another given tool of the second group of tools, which is removed from the at least one second tool magazine, at the predetermined transfer position at the same time, or the feeding device stores another given tool of the first group of tools, which is fed by the first tool magazine, in the at least one second tool magazine.

3. The system according to claim 2, wherein:

the transfer apparatus and the another feeding device are made as a module, by means of which the tools of the first group are moved between the first tool magazine and the spindle, and by means of which the tools of the first group are moved from the first tool magazine to the at least one second tool magazine, and by means of which the tools of the second group of tools are moved from the at least one second tool magazine to the first tool magazine; and
the transfer apparatus takes up the removed tool of the second group of tools provided by the feeding device at the predetermined transfer position, or the transfer apparatus provides the tools of the first group, which are removed from the first tool magazine, to the feeding device at the predetermined transfer position.

4. The system according to claim 1, wherein the first tool magazine is made as a wheel-type magazine in which the tools of the first group are held such that a longitudinal axis of each of the tools of the first group extends in a radial direction of the wheel-type magazine.

5. The system according to claim 4, wherein:
the machine tool having the spindle accommodates the tools of the first group; and
the first tool magazine is arranged on the machine tool in such a way that a circumferential line, along which the tools of the first group are moved during indexing of the first tool magazine, lies in a plane that is perpendicular to a bottom surface and extends substantially parallel to a plane of a bed and a column of the machine tool.

6. The system according to claim 1, wherein the tools of the first group are held in respective tool holders along a circumference of the first tool magazine, which is made as a wheel-type magazine, in such a way that longitudinal axes of the tools of the first group lie in one plane and protrude beyond the circumference of the first tool magazine, and the tools of the first group are moved along the circumference of the first tool magazine during indexing of the first tool magazine.

7. The system according to claim 1, wherein the at least one second tool magazine is made as a matrix magazine or as a shelf magazine.

8. The system according to claim 1, wherein:
an average tool provisioning time of the first tool magazine is shorter than an average tool provisioning time of the at least one second tool magazine, with the result that a given one of the tools of the first group stored in the first tool magazine is removed more rapidly than a given one of the tools of the second group stored in the at least one second tool magazine from a respective storage spot and is fed to a predetermined tool provisioning position; and
a tool storing capacity of the at least one second tool magazine is greater than a tool storage capacity of the first tool magazine, with the result that a number of the tools of the second group storable in the at least one second tool magazine is larger than a number of the tools of the first group storable in the first tool magazine.

9. The system according to claim 1, wherein:
the spindle accommodates a selected one of the tools of the first group and the second group at a given time; and
a travel of a given one of the tools of the first group from the first tool magazine to the spindle is shorter than a travel of a given one of the tools of the second group from the at least one second tool magazine to the spindle of the machine tool.

10. The system according to claim 9, wherein selected tools of the first group and/or the second group are provided in a first transfer position, the predetermined transfer position, and a change position on the spindle in such a way that longitudinal axes of the selected tools are oriented in these respective positions in horizontal alignment and parallel to one another, the first transfer position being a tool provisioning position where the tools of the first group are transferrable to the transfer apparatus.

11. The system according to claim 1, wherein:
the first tool magazine is arranged closer to the spindle than the at least one second tool magazine; and
an average tool provisioning time of the first tool magazine is shorter than an average tool provisioning time of the at least one second tool magazine, with the result that a given one of the tools of the first group, which is stored in the first tool magazine, is more rapidly removed from a storage spot than a given one of the tools of the second group, which is stored in the at least one second tool magazine, and is fed to a predetermined tool provisioning position on the spindle.

12. A machine tool for processing a workpiece, including a spindle and a system for providing tools to the spindle, the system comprising:
a first tool magazine accommodating a first group of tools;
at least one second tool magazine accommodating a second group of tools;
a feeding device adapted to remove a given tool of the second group of tools from the at least one second tool magazine, the removed tool of the second group of tools being provided at a predetermined transfer position at the at least one second tool magazine; and
a transfer apparatus including a gripper configured to grip the removed tool of the second group of tools, the removed tool of the second group of tools being removed from the at least one second tool magazine by the feeding device and being provided at the predetermined transfer position, the transfer apparatus being adapted to feed the removed tool of the second group of tools, while the removed tool of the second group of tools is being held by the gripper, along a linear travel axis from the predetermined transfer position to the first tool magazine, with the result that the at least one second tool magazine serves as a supply magazine for the first tool magazine, the transfer apparatus also being adapted to feed the removed tool of the second group of tools, while the removed tool of the second group of tools is being held by the gripper, along the linear travel axis from the predetermined transfer position to a position along the linear travel axis at which the transfer apparatus inserts the removed tool of the second group of tools, by the gripper, directly into the spindle of the machine tool, the linear travel axis extending: (i) from the first tool magazine to the spindle of the machine tool, and (ii) from the first tool magazine to the at least one second tool magazine.

* * * * *